United States Patent
Ham et al.

(10) Patent No.: US 7,370,005 B1
(45) Date of Patent: May 6, 2008

(54) INVENTORY REPLICATION BASED UPON ORDER FULFILLMENT RATES

(76) Inventors: Peter Ham, 250 Walter Hays Dr., Palo Alto, CA (US) 94303; Boris Klots, 1566 Winding Way, Belmont, CA (US) 94002; Radhakrishna Hari, 144 Northampton La., Belmont, CA (US) 94002; Franklin R. Koenig, 1944 Tasso St., Palo Alto, CA (US) 94301; Gautam Bhargava, 10147 N. Portal Ave., Cupertino, CA (US) 95014; Gerry Perham, 2211 California St. #207, San Francisco, CA (US) 94115

( * ) Notice: Subject to any disclaimer, the term of this patent is extended or adjusted under 35 U.S.C. 154(b) by 0 days.

(21) Appl. No.: 09/568,570

(22) Filed: May 10, 2000

Related U.S. Application Data

(60) Provisional application No. 60/133,646, filed on May 11, 1999.

(51) Int. Cl.
*G06Q 30/00* (2006.01)
(52) U.S. Cl. .......................................... 705/26; 705/28
(58) Field of Classification Search ................. 705/22, 705/28, 16, 26, 27, 29; 700/216
See application file for complete search history.

(56) References Cited

U.S. PATENT DOCUMENTS

| | | | |
|---|---|---|---|
| 2,781,643 A | 2/1957 | Fairweather | |
| 3,406,532 A | 10/1968 | Rownd et al. | |
| 3,670,867 A * | 6/1972 | Traube | 198/349.8 |
| 4,213,310 A | 7/1980 | Buss | |
| 4,455,453 A * | 6/1984 | Parasekvakos et al. | 379/106.06 |
| 4,656,591 A | 4/1987 | Goldberg | |

(Continued)

FOREIGN PATENT DOCUMENTS

FR 2 696 722 A1 * 4/1994 ................. 414/279

(Continued)

OTHER PUBLICATIONS

Maloney, David, "The New Corner Drugstore", May 1, 2000, Modern Materials Handling, vol. 55, No. 5, p. 58.*

(Continued)

*Primary Examiner*—Gerald J. O'Connor

(57) ABSTRACT

A load balancing technology segregates various inventory types (e.g., potatoes vs. milk, vs. pretzels, vs. tissue paper, etc.) based upon how frequently they are ordered in a distribution center. Inventory types that are ordered at the slowest rate are not "replicated" over multiple pods in the distribution center. Rather, they are constrained to reside at a single pod within the distribution center. Items that are ordered somewhat more frequently than those in the slowest group are replicated in multiple pods across the distribution center. In other words, these items are separately stocked at locations on more than one pod in the distribution center. This means that a container passing through the distribution center can obtain each of the items in the second group of item types at multiple pods in the distribution center. Thus, these items do not create a bottleneck in the order fulfillment process. Inventory types in a third group, the fastest movers, are segregated from items in the first two groups. They are stored in a separate type of pod that fulfills orders even faster than the other type of pods.

21 Claims, 6 Drawing Sheets

U.S. PATENT DOCUMENTS

| | | | |
|---|---|---|---|
| 4,799,156 A | | 1/1989 | Shavit et al. |
| 4,887,208 A | | 12/1989 | Schneider et al. |
| 4,936,738 A | * | 6/1990 | Brennan et al. ............ 414/807 |
| 5,038,283 A | | 8/1991 | Caveney |
| 5,093,794 A | | 3/1992 | Howie et al. |
| 5,105,627 A | | 4/1992 | Kurita |
| 5,113,349 A | * | 5/1992 | Nakamura et al. .......... 700/215 |
| 5,122,959 A | | 6/1992 | Nathanson et al. |
| 5,235,819 A | | 8/1993 | Bruce |
| 5,237,158 A | | 8/1993 | Kern et al. |
| 5,246,332 A | | 9/1993 | Bernard |
| 5,265,006 A | | 11/1993 | Asthana |
| 5,272,638 A | | 12/1993 | Martin et al. |
| 5,273,392 A | | 12/1993 | Bernard |
| 5,322,406 A | | 6/1994 | Pippin et al. |
| 5,363,310 A | | 11/1994 | Haj-Ali-Ahmadi et al. |
| 5,395,206 A | | 3/1995 | Cerny, Jr. |
| 5,428,546 A | | 6/1995 | Shah et al. |
| 5,533,361 A | | 7/1996 | Halpern |
| 5,548,518 A | | 8/1996 | Dietrich et al. |
| 5,568,393 A | * | 10/1996 | Ando et al. .................. 700/214 |
| 5,593,269 A | | 1/1997 | Bernard |
| 5,615,121 A | | 3/1997 | Babayev et al. |
| 5,664,110 A | * | 9/1997 | Green et al. .................. 705/26 |
| 5,666,493 A | | 9/1997 | Wojcik et al. |
| 5,694,551 A | | 12/1997 | Doyle et al. |
| 5,712,989 A | | 1/1998 | Johnson et al. |
| 5,758,313 A | | 5/1998 | Shah et al. |
| 5,758,328 A | | 5/1998 | Giovannoli |
| 5,761,673 A | | 6/1998 | Bookman et al. |
| 5,768,139 A | | 6/1998 | Pippin et al. |
| H1743 H | | 8/1998 | Graves et al. |
| 5,809,479 A | | 9/1998 | Martin et al. |
| 5,826,242 A | | 10/1998 | Montulli |
| 5,826,825 A | | 10/1998 | Gabriel |
| 5,831,860 A | | 11/1998 | Foladare et al. |
| 5,832,457 A | | 11/1998 | Cherney |
| 5,834,753 A | | 11/1998 | Danielson et al. |
| 5,835,914 A | | 11/1998 | Brim |
| 5,839,117 A | | 11/1998 | Cameron et al. |
| 5,848,395 A | | 12/1998 | Edgar et al. |
| 5,878,401 A | | 3/1999 | Joseph |
| 5,880,443 A | | 3/1999 | McDonald et al. |
| 5,893,076 A | | 4/1999 | Hafner et al. |
| 5,894,554 A | | 4/1999 | Lowery et al. |
| 5,897,622 A | | 4/1999 | Blinn et al. |
| 5,897,629 A | | 4/1999 | Shinagawa et al. |
| 5,899,088 A | | 5/1999 | Purdum |
| 5,910,896 A | | 6/1999 | Hahn-Carlson |
| 5,918,213 A | | 6/1999 | Bernard et al. |
| 5,943,652 A | | 8/1999 | Sisley et al. |
| 5,943,841 A | | 8/1999 | Wunscher |
| 5,956,709 A | | 9/1999 | Xue |
| 5,961,601 A | | 10/1999 | Iyengar |
| 5,963,919 A | | 10/1999 | Brinkley et al. |
| 5,979,757 A | | 11/1999 | Tracy et al. |
| 6,023,683 A | * | 2/2000 | Johnson et al. ............... 705/26 |
| 6,026,378 A | * | 2/2000 | Onozaki ...................... 705/28 |
| 6,061,607 A | | 5/2000 | Bradley |
| 6,070,147 A | | 5/2000 | Harms et al. |
| 6,073,108 A | | 6/2000 | Peterson |
| 6,081,789 A | | 6/2000 | Purcell |
| 6,083,279 A | | 7/2000 | Cuomo et al. |
| 6,085,170 A | | 7/2000 | Tsukuda |
| 6,101,481 A | | 8/2000 | Miller |
| 6,101,486 A | * | 8/2000 | Roberts et al. ............... 705/27 |
| 6,140,922 A | | 10/2000 | Kakou |
| 6,178,510 B1 | | 1/2001 | O'Connor et al. |
| 6,182,053 B1 | * | 1/2001 | Rauber et al. ................ 705/28 |
| 6,185,625 B1 | | 2/2001 | Tso et al. |
| 6,215,952 B1 | | 4/2001 | Yoshio et al. |
| 6,233,543 B1 | | 5/2001 | Butts et al. |
| 6,249,801 B1 | | 6/2001 | Zisapel et al. |
| 6,260,024 B1 | | 7/2001 | Shkedy |
| 6,275,812 B1 | | 8/2001 | Haq et al. |
| 6,289,260 B1 | | 9/2001 | Bradley et al. |
| 6,289,370 B1 | | 9/2001 | Panarello et al. |
| 6,292,784 B1 | | 9/2001 | Martin et al. |
| 6,324,520 B1 | | 11/2001 | Walker et al. |
| 6,332,334 B1 | | 12/2001 | Faryabi |
| 6,341,269 B1 | * | 1/2002 | Dulaney et al. ............... 705/22 |
| 6,343,275 B1 | | 1/2002 | Wong |
| 6,397,246 B1 | | 5/2002 | Wolfe |
| 6,405,173 B1 | | 6/2002 | Honarvar et al. |
| 6,424,947 B1 | | 7/2002 | Tsuria et al. |
| 6,445,976 B1 | | 9/2002 | Ostro |
| 6,453,306 B1 | | 9/2002 | Quelene |
| 6,463,345 B1 | | 10/2002 | Peachey-Kountz et al. |
| 6,463,420 B1 | | 10/2002 | Guidice et al. |
| 6,490,567 B1 | | 12/2002 | Gregory |
| 6,496,205 B1 | | 12/2002 | White et al. |
| 6,505,093 B1 | | 1/2003 | Thatcher et al. |
| 6,505,171 B1 | | 1/2003 | Cohen et al. |
| 6,526,392 B1 | | 2/2003 | Dietrich et al. |
| 6,530,518 B1 | | 3/2003 | Krichilsky et al. |
| 6,549,891 B1 | * | 4/2003 | Rauber et al. ................ 705/28 |
| 6,567,786 B1 | | 5/2003 | Bibelnieks et al. |
| 6,571,213 B1 | | 5/2003 | Altendahl et al. |
| 6,578,005 B1 | | 6/2003 | Lesaint et al. |
| 6,598,027 B1 | | 7/2003 | Breen, Jr. |
| 6,622,127 B1 | | 9/2003 | Klots et al. |
| 6,654,726 B1 | | 11/2003 | Hanzek |
| 6,697,964 B1 | | 2/2004 | Dodrill et al. |
| 6,741,995 B1 | | 5/2004 | Chen et al. |
| 6,748,418 B1 | | 6/2004 | Yoshida et al. |
| 6,763,496 B1 | | 7/2004 | Hennings et al. |
| 6,862,572 B1 | | 3/2005 | de Sylva |
| 6,879,965 B2 | | 4/2005 | Fung et al. |
| 6,970,837 B1 | | 11/2005 | Walker et al. |
| 6,990,460 B2 | | 1/2006 | Parkinson |
| 2001/0037229 A1 | | 11/2001 | Jacobs et al. |
| 2001/0042021 A1 | | 11/2001 | Matsuo et al. |
| 2001/0047285 A1 | | 11/2001 | Borders et al. |
| 2001/0047310 A1 | | 11/2001 | Russell |
| 2001/0049619 A1 | | 12/2001 | Powell et al. |
| 2001/0049672 A1 | | 12/2001 | Moore |
| 2002/0004766 A1 | | 1/2002 | White |
| 2002/0007299 A1 | | 1/2002 | Florence |
| 2002/0013950 A1 | | 1/2002 | Tomsen |
| 2002/0038224 A1 | | 3/2002 | Bhadra |
| 2002/0049853 A1 | | 4/2002 | Chu et al. |
| 2002/0065700 A1 | | 5/2002 | Powell et al. |
| 2002/0188530 A1 | | 12/2002 | Wojcik et al. |
| 2002/0194087 A1 | | 12/2002 | Spiegel et al. |
| 2003/0045340 A1 | | 3/2003 | Roberts |
| 2003/0079227 A1 | | 4/2003 | Knowles et al. |
| 2003/0233190 A1 | | 12/2003 | Jones |
| 2004/0236635 A1 | | 11/2004 | Publicover |
| 2005/0027580 A1 | | 2/2005 | Crici et al. |
| 2005/0144641 A1 | | 6/2005 | Lewis |

FOREIGN PATENT DOCUMENTS

| | | |
|---|---|---|
| GB | 2 265 032 A | 9/1993 |
| WO | WO99/07121 | 2/1999 |

OTHER PUBLICATIONS

Van den Berg, Jeroen, "A Literature Survey on Planning and Control of Warehousing Systems", Aug. 1999, IIE Transactions vol. 31, No. 3, p. 751.*

Koster, Rene de, "Routing Orderpickers in a Warehouse", May 1998, vol. 30, No. 5, p. 469.*

Automatic ID News, "20/20 Results Achieved with Technology Trio", Sep. 1995, p. 19.*

Wilson, Joe, "Selecting Warehouse Management Software (WMS) for Food Distribution Operations", Frozen Food Digest, Oct. 1998, vol. 14, No. 1, p. 18.

The Impact of Electronic Data Interchange on Competitiveness in Retail Supply Chain, Brian Fynes et al., IBAR v14n2 pp. 16-2 1993.

Vass et al., "The World Wide Web—Everything you (n)ever wanted to know about its server", IEEE, Oct./Nov. 1998, pp. 33-37.

Wunnava et al., "Interactive Multimedia on the World Wide Web", IEEE, Aug. 1999, pp. 110-115.

U.S. Appl. No. 09/568,571, filed May 10, 2000.

U.S. Appl. No. 09/568,572, filed May 10, 2000.

U.S. Appl. No. 09/568,603, filed May 10, 2000.

U.S. Appl. No. 09/568,613, filed May 10, 2000.

U.S. Appl. No. 09/568,614, filed May 10, 2000.

U.S. Appl. No. 09/568,823, filed May 10, 2000.

U.S. Appl. No. 09/620,199, filed Jul. 20, 2000.

U.S. Appl. No. 09/750,385, filed Dec. 27, 2000.

U.S. Appl. No. 09/792,400, filed Feb. 22, 2001.

U.S. Appl. No. 09/813,235, filed Mar. 19, 2001.

Anupindi et al., "Estimation of Consumer Demand with Stock-Out Based Substitution: An Application to Vending Machine Product", Marketing Science, vol. 17, No. 4, 1998, pp. 406-423.

Smith et al., "Management of Multi-Item Retail Inventory Systems with Demand Substitution", Operations Research, vol. 48, No. 1, Jan.-Feb., pp. 50-64.

Norton, Tim R., "End-To-End Responses-Time: Where to Measure?", Computer Measurement Group Conference Proceedings, CMG99 Session 423, Dec. 1999, pp. 1-9.

www.peapod.com, including Introduction to Peapod; How Peapod Works; Peapod: Choosing a Delivery Time; Peapod: Sending Your Order; Retrieved from Internet Archive (web.archive.org) on Jul. 23, 2006, alleged date Nov. 13, 1996, pp. 1-9.

Worth Wren Jr., Fort Worth Star-Telegram Texas, "Albertson's Expects Online Grocery Shopping to Boom", KRTBN Knight-Ridder Tribune Business News (Fort Worth Star-Telegram, Texas), Nov. 9, 1998.

"Peapod Interactive Grocery Shopping and Delivery Service Now Delivers Via the Internet", Press Release, peapod.com, Apr. 22, 1996, pp. 1-2.

Pearce, Michael R. "From carts to clicks", Ivey Business Quarterly, vol. 63, No. 1, p. 69-71, Autumn 1998.

Hyten, Todd, "Stop & Shop mulls online grocery store", Boston Business Journal (Boston, MA, US), vol. 16, No. 6, p. 1, Mar. 22, 1996.

Fielding et al., "Hypertext Transfer Protocol—HTTP/1.1, RFC 2616", Network Working Group, Jun. 1999, pp. 1-90.

PC Foods, "Customer Service Agreement," printed from website: http://www.pcfoods.com, Abstract No. XP-002245026, 1999, pp. 1-2.

Henry Towie, "On the Fast Track with Totaltracks: UPS Deploys Mobile Date Service," Abstract No. XP-000560076, Document Delivery World, vol. 9, No. 3, 1993, pp. 30-31.

Hiroo Kawata, "Information Technology of Commercial Vehicles in the Japanese Parcel Service Business," Abstract No. XP-000560489, 1992, pp. 371-382.

Takashi Sekita, "The Physical Distribution Information Network in the Home-Delivery Business," Japan Computer Quarterly, Abstract No. XP-00.431194, 1990, pp. 23-32.

PC Foods, "Customer Service Agreement," printed from website: http://www.pcfoods.com, Abstract No., XP-002245026, 1999, pp. 1-2.

Henry Towie, "On the Fast Track with Totaltracks: UPS Deploys Mobile Date Service," Abstract No., XP-000560076, Document Delivery World, vol. 9, No. 3, 1993, pp. 30-31.

Hiroo Kawata, "Information Technology of Commercial Vehicles in the Japanese Parcel Service Business," Abstract No., XP 000560489, 1992, pp. 371-382.

Takashi Sekita, "The Physical Distribution Information Network in the Home-Delivery Business," Japan Computer Quarterly, Abstract No., XP-00.431194, 1990, pp. 23-32.

\* cited by examiner

INVENTORY REPLICATION BASED UPON ORDER FULFILLMENT RATES

CROSS-REFERENCE TO RELATED APPLICATIONS

This application claims priority under 35 U.S.C. 119(e) from U.S. Provisional Patent Application No. 60/133,646 filed on May 11, 1999, naming L. Borders, G. Dahl, et al. as inventors and titled "ELECTRONIC COMMERCE ENABLED DELIVERY SYSTEM AND METHOD." That application is incorporated herein by reference for all purposes. This application is also related to U.S. patent application Ser. No. 09/568,603, titled "INTEGRATED SYSTEM FOR ORDERING, FULFILLMENT, AND DELIVERY OF CONSUMER PRODUCTS USING A DATA NETWORK," naming Borders et al. as inventors, to U.S. patent application Ser. No. 09/568,569, now U.S. Pat. No. 6,622,127, titled "ORDER ALLOCATION TO SELECT FROM INVENTORY LOCATIONS STOCKING FEW UNITS OF INVENTORY," naming Klots et al. as inventors, and to U.S. patent application Ser. No. 09/568,571, titled "ORDER ALLOCATION TO MINIMIZE CONTAINER STOPS IN A DISTRIBUTION CENTER," naming Waddington et al. as inventors, all filed on the same day as the instant application. Each of the above-referenced US Patent Applications is incorporated herein by reference for all purposes.

BACKGROUND OF THE INVENTION

The present invention relates to distribution centers for distributing inventory to customers. More particularly, the invention relates to load balancing in distribution centers.

Distribution centers are buildings or regions where inventory is stored and used to fulfill orders for customers. Customers place orders by various modes such as by telephone, mail, Internet browsers, and the like. The enterprise running the distribution center attempts to fulfill as many orders as possible in the shortest amount of time.

A distribution center's "throughput" is defined as the volume of inventory or number of orders fulfilled in a given unit of time. At least two parameters feature prominently in maximizing throughput: (a) useable inventory and (b) load balancing during order fulfillment. Usable inventory simply refers to the amount of inventory that is immediately available for order fulfillment. Obviously, if a distribution center has insufficient inventory to immediately fulfill all its orders, that distribution center cannot realize its potentially highest throughput. Load balancing refers to consistently using all order fulfillment mechanisms available for fulfilling orders. If any of these mechanisms sit idle, throughput drops off rapidly.

A given distribution center may have many order fulfillment mechanisms. In one example, the distribution center includes a conveyor belt that transports a container to various locations, each of which has an order fulfillment mechanism. One location may have a bank of carousels, each containing numerous bins. Each bin holds one or more types of inventory. The carousel moves into a position where items of inventory can be placed in the container on the conveyer belt. Another location may have a few aisles each containing multiple bins. A worker moves through the aisles to pick out requested items and place them in the container. Other types of order fulfillment mechanisms may be employed. The term "pod" will be used herein to describe any and all types of order fulfillment mechanisms. Each pod has one or more types of inventory available for "picking." Picking refers to the operation of retrieving an item of inventory from a pod and placing it into a container. The container holds the various items that fulfill a given order.

Given that different customers have very different needs and preferences, different orders provide wide and rather unpredictable variation. Optimal load balancing to meet this variation presents a serious challenge. During a given week, for example, several grocery orders may require milk, but only a few of these require anchovies, a few others require spicy tofu, and still a few others require cotton swabs. In fulfilling these various orders, any one of these items could present a throughput bottleneck. Controlling the position and path of a container used to fulfill an order can partially address this problem. However, additional mitigation might result from intelligently distributing or arranging the inventory at specific locations within the distribution center.

The present invention fills a need for better ways to distribute inventory within a distribution center.

SUMMARY OF THE INVENTION

The present invention provides a load balancing technology that segregates various inventory types (e.g., potatoes vs. milk, vs. pretzels, vs. tissue paper, etc.). The inventory types are grouped based upon how frequently they are ordered in a distribution center. In a distribution center that distributes groceries, for example, certain staples such as milk are ordered very frequently. Other items such as cranberry sauce may be ordered very infrequently (except shortly before Thanksgiving). Still other items such as pretzels may be ordered with intermediate frequency.

In this invention, inventory types that are ordered at the slowest rate (e.g., cranberry sauce in the above example) are not "replicated" over multiple pods in the distribution center. Rather, they are constrained to reside at a single pod within the distribution center. Items that are ordered somewhat more frequently (e.g., pretzels) are replicated in multiple pods across the distribution center. In other words, these items are separately provided at locations on more than one pod in the distribution center. In a preferred embodiment, they are stored at all pods (or at least all pods of a particular type such as carousels) within the distribution center. This means that a container passing through the distribution center can obtain each of the items it needs from the second group at any particular pod in the distribution center. Thus, these items do not create a bottleneck in the order fulfillment process.

Inventory types in the third group, the fastest movers, may be segregated from items in the first two groups. Preferably they are stored in a separate type of pod that fulfills orders even faster than the other type of pods. In a preferred embodiment, inventory in the third group is stocked in a mechanical pod rather than in a carousel. In a specific embodiment, items in this third, fastest category of inventory are not replicated across multiple pods.

One aspect of the invention pertains to a method of distributing inventory to facilitate order throughput in a distribution center. The method may be characterized by the following sequence: (a) for each type of inventory to be distributed, determining how rapidly that type of inventory is consumed; (b) identifying a first group of inventory types that are relatively slower moving types of inventory and distributing the inventory types from this first group over multiple pods in the distribution center without replicating a given type in more than one pod; and (c) identifying a second group of inventory types that are relatively faster moving types of inventory and replicating inventory types from the second group at multiple pods. As mentioned, the inventory may be further classified into third group of inventory types that move faster than inventory types in the second group. Preferably, inventory types from this group are stocked in one or more high throughput pods.

Preferably, inventory types from the first group (the slowest movers) are randomly distributed over the multiple pods. In other words, a pod is randomly selected for a given inventory type in the first group. On the other hand, inventory types from the second group preferably are replicated over all pods in the distribution center. In a specific embodiment, the second group inventory types are distributed over all pods of a particular type such as carousels.

Various mechanisms may be employed to determine how rapidly inventory is consumed. For example, the distribution center may track how frequently the various inventory items are ordered. In a preferred embodiment, inventory items in the first group (the slow movers) are identified as those that are consumed at a rate of less than one bin's worth of inventory per unit time; a bin is a portion of a pod that holds only one inventory type. In a very specific example, inventory types that move at a rate of less than 10 bins per week are identified as belonging to the first group of inventory types.

Another aspect of this invention pertains to distribution centers having inventory arranged to facilitate order throughput. Such distribution centers may be characterized by the following group of features: (a) a conveyor for moving containers throughout the distribution center in a manner allowing items in the distribution center to be placed in the containers to fill orders; (b) a plurality of pods proximate the conveyor, each pod stocked with specified types of inventory for filling orders; (c) a first, slow moving, group inventory types (as described above) distributed over multiple pods and without replication; and (d) a second, faster moving, group of inventory types (as described above) replicated over multiple pods. The distribution center typically includes one or more computer controllers that direct the containers over specified paths within the distribution center and specify items to be placed in the containers.

The distribution center may include various types of pods including high throughput mechanical pods that include one or more aisles stocked with inventory and arranged to allow rapid picking. In a preferred embodiment, inventory types from a third, very rapidly moving, group are stocked in mechanical pods. Another common type of pod is the carousel, which can rotate into various positions and thereby make different items available for placement into the containers.

Another aspect of the invention pertains to computer program products including a machine-readable medium on which is provided program instructions for implementing one or more of the methods or computer user interfaces described herein. Any of the methods or interfaces of this invention may be represented as program instructions that can be provided on such computer readable media.

These and other features and advantages of the present invention will be described in more detail below with reference to the associated figures.

DETAILED DESCRIPTION OF THE PREFERRED EMBODIMENTS

Figure 1:
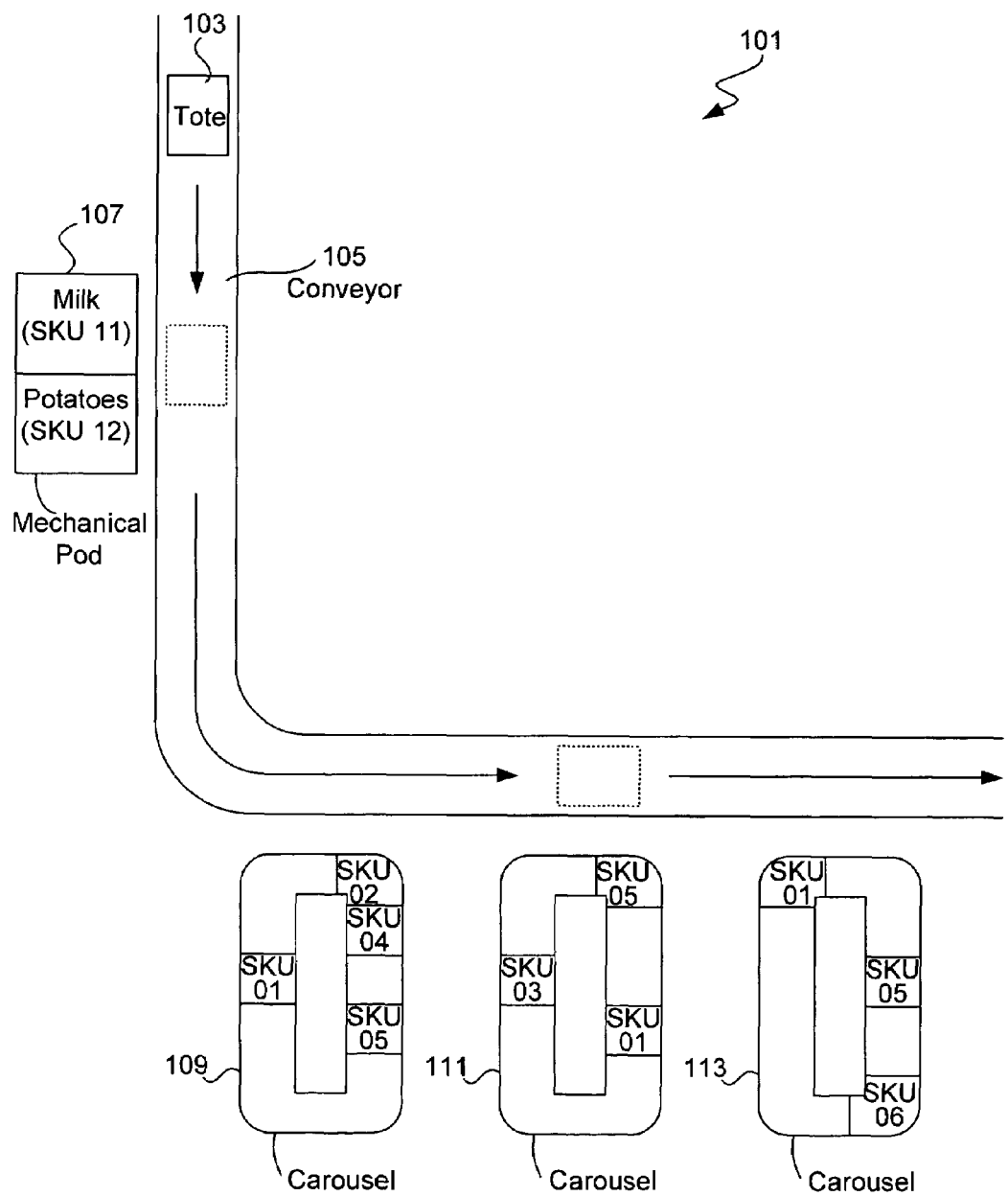
FIG. 1 is a block diagram of a distribution center in which inventory is placed based upon how rapidly it is consumed.

The following discussion presents some terms and concepts pertinent to the operation of a distribution center. The invention is not specifically limited to the examples described hereafter.

Totes are storage containers used to hold products for transportation to the consumer. There may be several different sizes of totes. Additionally, some totes may be designed for holding frozen and refrigerated goods. In some embodiments, the totes are relatively sturdy and have closable lids.

Each tote may have an identifier to support automated movement through the distribution center by conveyor. For example, each tote can have a bar code identifier that can be scanned as it moves past various points in the system. In this manner, a tote can be moved from a tote induction area to a specific pod or other location with the system tracking the location of the tote.

As indicated, a distribution center has a transport system such as a conveyor that moves totes and trays to pods and other locations within distribution center. "Trays" are used to transport new inventory from a receiving station in the distribution center to individual pods within the distribution center. Identifiers on the trays and totes allow them to be automatically routed to specific destinations within the distribution center. In a specific embodiment, conveyors from Buschmann Company, Cincinnati, Ohio, are used. In another specific embodiment, software from SeayCo Integrators, Conyers, Ga. automates conveyor movement.

Generally, a pod is a collection of storage areas (inventory locations or bins) within a distribution center. As mentioned, a single distribution center may have several types of pods. Each of the different pods and pod types may be adapted for different temperatures, e.g., frozen goods mechanized pod. The different pods and pod types may also be adapted for the rate of product movement, e.g., mechanized pods for fast moving items.

Carousel pods include one or more carousels adjacent to one or more conveyors. In one embodiment, each pod has three carousels adjacent to two conveyors for incoming trays and totes. In some embodiments, two additional conveyors are provided: an express conveyor and an empty conveyor. The express conveyor is used to transport totes directly from the carousel pod to the outbound distribution point for totes. The empty conveyor is used to transport empty trays back to the receiving area to receive new incoming products.

Generally, a carousel is a rotating high capacity storage area. Due to the rotating design of the carousels, only items stored in a small section of the carousel can be easily accessed at a given time. This trade-off allows the carousels to store large numbers of items at the expense of rapid access. One suitable carousel for use with this invention is available from Diamond Phoenix, Lewiston, Me.

Mechanized pods, or mechanical pods, are areas designed to hold the faster moving, and also bulkier and heavier, products for easy access. Each mechanized pod may have inbound and outbound conveyors. Received products may be placed directly into the mechanical pod for storing. Because the mechanical pod items may also be bulkier and heavier than other products, totes that include mechanical pod items may be sent to the mechanical pod prior to the other pods.

Manual pods are areas where "fill to order" items such as produce, bulk foods, pharmacy prescriptions, and/or prepared meals may be prepared and/or stored. The products in the manual pods are typically placed in totes last. Products in manual pods are customer specific preparations. Items are brought from fill to order preparation areas to the manual pods for placement (pick tasks) into totes.

A "pick task" is the retrieval of a product, or multiple quantities of the same product, to fill an order. Thus, an order for ten different products would be comprised of ten pick tasks. However, if the order included five bags of Brand X potato chips, that might be consolidated into a single pick task—depending on the number of bags of potato chips in the pod. For example, if pod two had only two bags of potato chips left and pod three had the last three bags of potato chips, two pick tasks would be required.

Carousel pick tasks may require the coordination of the conveyors to transport the tote to the appropriate pod with the carousels to bring the appropriate storage tray to an accessible position. The pick task may be scheduled, or generated, prior to the actual physical movement of the product, or products, from a carousel location to a tote. Once the pick task is accomplished, the conveyor may move the tote to the next destination automatically. In some embodiments, a push button signal is employed to allow the pick operator to signal that she/he has placed the product, or products, into the tote. Mechanized pick tasks can be accomplished by using carts to move totes received on the inbound conveyor to the products. The products can then be put into the totes for delivery. Once the necessary items are in the totes, the tote is placed on the outbound conveyors. The process for manual pick tasks may be similar to the mechanized pick task. The tote that arrives on the inbound conveyor is scanned. A list of locations with items for the tote is displayed. An operator retrieves the indicated items from the listed locations and then transfers the tote on the outbound conveyor.

A put-away task is the storage of a product in a pod. The product must be stored in a temperature appropriate pod. For example, dairy products must be stored at certain temperatures to avoid spoilage. In addition, depending on the type of product, one of the different types of pods will be selected.

The carousels are used to store items in trays. Once the products have been placed in trays, they can either be sent by conveyor for direct put away in the carousels or held on flow racks for later put away. The scheduling of the put away can be based on product shipments, available inventory, load, and other options.

Once the tray is received by conveyor at the carousel pod, audible and/or visual annunciators indicate the storage location for the tray. The carousel movements are coordinated with the conveyors so that the appropriate storage area of the carousel is available when the tray is to be stored. Weight planning can be used so that heavier trays are stored at or below waist level while lighter trays are stored at or above waist level in the carousel.

Each mech pod item has one or more fixed locations. For example, diet soda might be stored in at location A-1. Thus, when the put away operator received diet soda, she/he will scan it and be told to store it at A-1.

FIG. 1 presents a highly simplified depiction of a distribution center 101. In this figure, a container 103 known as a "tote" is introduced into a tote path in the distribution center and moves about on a conveyor 105. It may stop at various pods as it moves throughout distribution center 101. At each pod, a human being, a robot, or a specialized mechanical device "picks" items from the pod and places them into the tote 103. At the end of the process, tote 103 is filled with items that are used to fill an order. A given order may include one or more totes filled with ordered items.

In the example depicted in FIG. 1, there are two types of pods: a mechanical pod 107 and carousels 109, 111, and 113. Various items, each representing a distinct inventory type, are provided in slots (e.g., bins) or other portions of the pods. Thus, each pod may contain numerous inventory types. Often these inventory types are referred to as SKUs (Stock Keeping Units). In a carousel, items are provided in particular slots or bins, which are rotated into position next to conveyor 105 to facilitate picking. In the example depicted in FIG. 1, carousel 109 has rotated into a temporary position with the items of SKU 02 available for picking. Likewise, carousel 111 has items from SKU 05 available for picking and carousel 113 has items from SKU 01 available for picking. Typically, when tote 103 stops at a conveyor position, it remains at that location until all items available at the proximate pod are picked and put into the tote (assuming that those items are necessary to fill an order associated with tote 103).

As mentioned, each different item of inventory is associated with a respective SKU. For reference, a "product" is a grouping of SKUs. Product information is higher level information that is pertinent to all SKUs in the grouping. It often defines a brand. A "category" is an even higher level classification based on how customers would expect products to be logically grouped. For example, the category "potato chips" may include the products "Brand X" potato chips and "Brand Y" potato chips. Further, the Brand X potato chip products may include a 16-ounce Brand X potato chips item (associated with a first SKU) and a 20-ounce Brand X potato chips item (associated with a second SKU).

Figure 2:
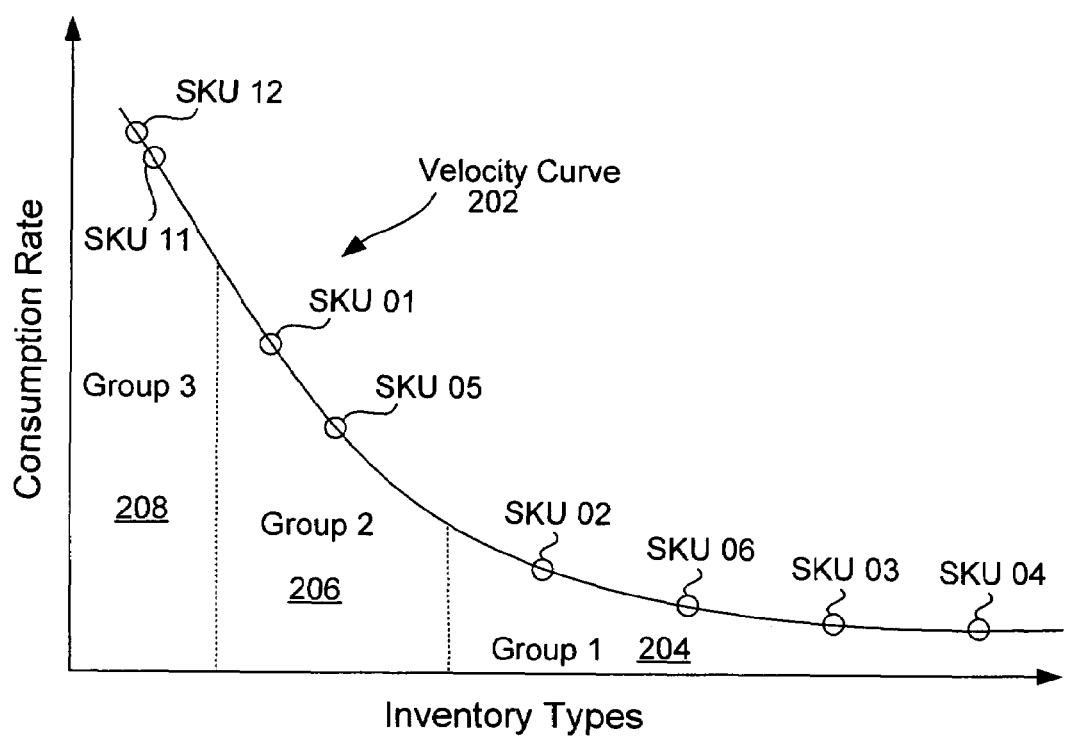
FIG. 2 is a velocity curve showing how various types of inventory are grouped based upon their relative consumption rates.

While FIG. 1 shows a distribution center having only one area that contains all pods, a typical distribution center may be divided into many more regions. For example, a distribution center may have three main temperature zones for products: ambient, refrigerated, and frozen. And within these three zones, there may be subzones for specialty items, e.g., for flowers, cigars, wines, and chocolates. Each zone or subzone may have its own collection of pods. Further, a distribution center may have kitchens, bakeries, deli departments, pharmacies, and other facilities to provide certain products FIG. 2 presents a "velocity curve" 202 showing order frequency (y axis) versus inventory types (x axis). Essentially, velocity curve 202 ranks inventory types by how fast they are used to fill orders. In the example of FIG. 2, items of SKU 12 and SKU 11 are consumed very rapidly. These may be potatoes and milk, for example. Moving down velocity curve 202, items in SKU 01 and SKU 05 are ordered at an intermediate rate. Near the slowest side of curve 202, the items of SKU 02, SKU 06, SKU 03, and SKU 04 reside.

In a preferred embodiment of this invention, inventory types are divided into two or more groups based upon where they reside on a velocity curve. As shown in the example of FIG. 2, inventory types at the slow end of velocity curve 202 are members of a First Group 204. Inventory types that move at intermediate velocity become members of a Second Group 206. Finally, inventory types that are consumed most rapidly from the distribution center become members of a Third Group 208.

This grouping is used to determine where individual inventory types are stocked within a distribution center. More specifically, methods of this invention select inventory types for specific pods based upon where the inventory types reside on a velocity curve.

In a preferred embodiment, items in the fastest moving group (Group 3 of FIG. 2) are provided in specially designed, very high speed pods such as mechanical pod 107 shown in FIG. 1. In many embodiments, items from the fastest moving inventory types are stored in only a single pod within a distribution center. In other words, they are not distributed at multiple pods within the distribution center. In the example of FIG. 1, all milk and potatoes (high-speed items) are stored only in mechanical pod 107. In other embodiments, such items are distributed over both a mechanical pod and a carousel to give more allocation flexibility.

The very slow moving items are not replicated over multiple pods. Rather, for each item in this group, the methods of this invention randomly select a pod. In the example of FIG. 1, items in SKU 02, SKU 03, SKU 04, and SKU 06 fall into this category. Thus, they are not replicated across multiple pods in distribution center 101. Preferably, such items are not stocked in the fastest moving pods. In the examples described herein, the slow moving items would be stocked only in carousels.

Those inventory types falling within the second group of a velocity curve are replicated across multiple pods in a distribution center. Thus, for example, items from SKUs 01 and 05 reside on multiple pods. In the specific example of FIG. 1, these items reside on each of carousels 109, 111, and 113. Preferably, though not necessarily, such items are not stocked in the fastest moving pods. In some instances, it may be desirable to allow some of these items to be replicated in both carousels and mechanical pods.

Typically, items from Groups 1 and 2 (the slow and medium speed groups) are constrained to reside only on carousels or other relatively slow moving pods. On the other hand, items from Group 3 (the fastest moving group) are allowed to reside in a very fast mechanical pod. Thus, in this embodiment, Groups 1 and 2 are distinguished from Group 3 based upon which type of pods they reside in. Groups 1 and 2 are distinguished from one another based upon whether they are replicated within their types of pod.

As suggested, however, the invention is not limited to these distinctions. For example, some distribution centers may have only a single pod type. In such cases, the important distinction will be drawn between Groups 1 and 2, where items in Group 1 are not replicated and items in Group 2 are replicated. Further, in distribution centers that contain two or more pod types, some items from Group 3 may reside on both pod types. Further, some items from Group 2 may reside on both pod types.

One reason to replicate some inventory items and not others is to balance the competing concerns of efficiently using available floor space and rapidly filling orders. Those items that are consumed relatively slowly, should not occupy floor space that could be more productively used to store faster moving items. Further, to fill orders rapidly, a tote should generally make as few stops as possible on its path through the distribution center.

Using the replication strategy of this invention, totes will generally require fewer stops to fill a given order. Stops will generally be determined by the slow moving items (Group 3) in a given order. For example, assume that an order requires milk, potatoes, an item from SKU 01, an item from SKU 04 and an item from SKU 05. Referring to FIG. 1, tote 103 will first stop at mechanical pod 107, where it receives milk and potatoes as necessary to fill its order. To obtain the items from SKUs 01 and 05, the tote could stop at any one of carousels 109, 111 and 113. However, the only item in the order from Group 1 (SKU 04) is located only at carousel 109. Thus, tote 103 stops at carousel 109 where the remaining items from the order can be picked. Because the distribution center replicates relatively faster moving inventory types, it minimizes the number of tote stops for many orders—as illustrated in this example.

As mentioned, the process of grouping inventory types into two or more separate groups for determining replication and pod type relies on the use of a velocity curve. However, the line between inventory items in two adjacent groups need not always be sharp. Further, the location of these lines on the velocity curve may vary from distribution center to distribution center depending upon the types, numbers, and placement of pods within the distribution center.

In one embodiment, the fastest moving inventory types are provided in mechanical pods. Starting with the fastest movers and continuing down the velocity curve, each inventory type is provided in the mechanical pods until there is no more available space in the mechanical pods. Continuing down the velocity curve, the next item types are provided in slower pods and replicated across these pods. At some point on the velocity curve, inventory items are no longer replicated.

Drawing the line on the velocity curve between the replicated and non-replicated items can be somewhat arbitrary. In one embodiment, the volume of a bin within a pod is used to help make this determination. If the quantity of items consumed in a given time period requires less than a full bin, then that item is deemed to be a slow mover which will not be replicated. For example, consider an item that can fit three of itself in a single bin. Assume further that there are ten pods over which replicated items must be distributed. Then, one might determine that thirty units of the item must be consumed within a week (or other unit of time) in order to support replication. If the consumption rate of this item is less than thirty per week, then the item is deemed a slow mover and is not replicated. In a different example, consider an item, which can fit four of itself within a given bin. And, assume that there are five pods over which replicated items are distributed. In this case, the item would have to be consumed at a rate of at least 20 units per week (or other unit of time) in order to be replicated. If the item did not support this level of consumption, then it would not be replicated. This example suggests that the order frequency or consumption rate on the velocity curve may be measured in terms of (bins or slots of the inventory type) consumed per unit time. Of course, other measures of consumption rate may be employed to draw the line between replicated and non-replicated inventory types.

As described in U.S. patent application Ser. No. 09/568,603 previously incorporated by reference), a distribution center may include a system of conveyers, carousels, scanners, and hand-held computing units for automating both the order fulfillment (outbound) and inventory restocking (inbound) processes, which are managed by an computer implemented Order Fulfillment Subsystem of the distribution center.

Figure 3:
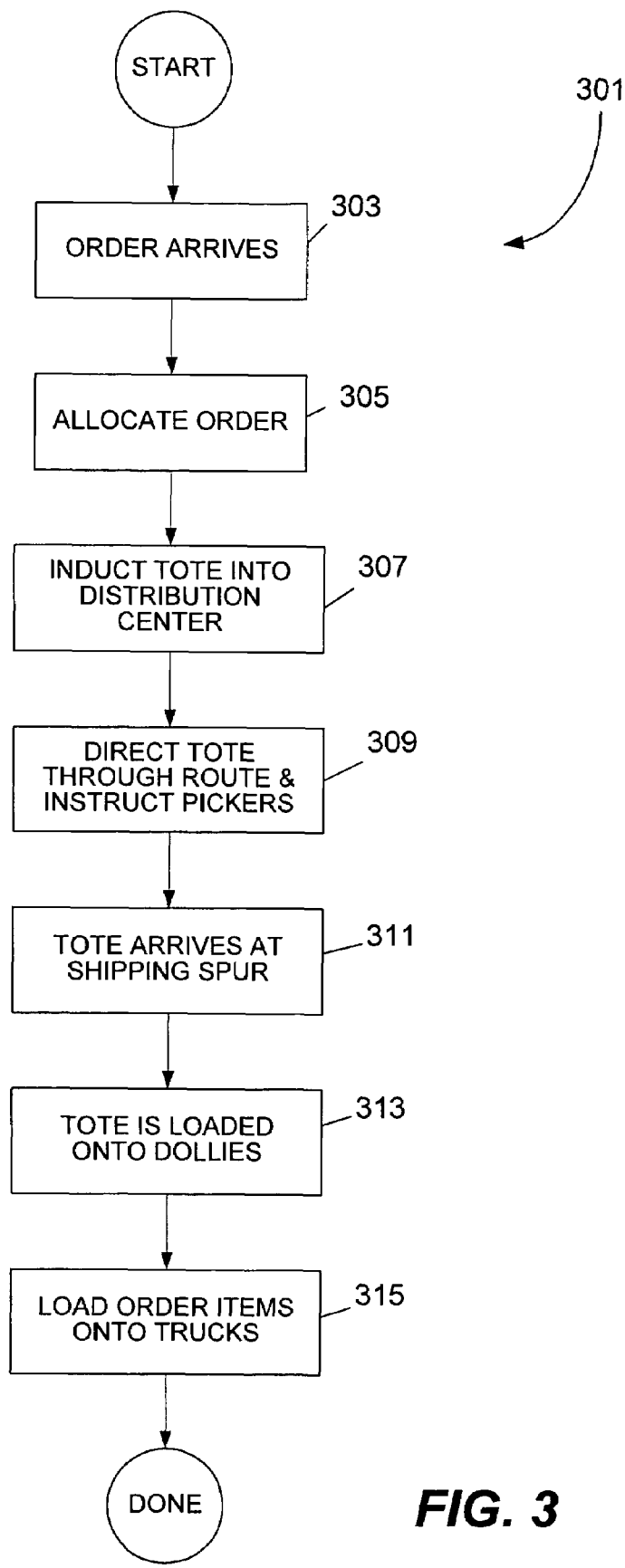
FIG. 3 is a flow chart depicting an order fulfillment method that may be used in a distribution center implementing the present invention.

One suitable outbound order fulfillment flow will now be depicted with reference to FIG. 3. Understand that various order fulfillment process flows may benefit from the technology of this invention. In FIG. 3, an order fulfillment flow 301 is depicted. Typically, this flow will be controlled and implemented by one or more computer systems associated with a distribution center. It begins at 303 with an order arriving for fulfillment. Such order may arrive via mail, telephone, the Internet, etc. In a preferred embodiment, the order is provided as a computer readable file in a standard format.

Next, at 305, order allocation takes place. This typically involves matching an order with particular inventory stored in a distribution center and determining where that inventory is located. It may also involve decrementing inventory within the distribution center under the assumption that such inventory will be picked to fill the order. Still further, the allocation process may determine the number of totes needed to fulfill the order and design the path for each tote to follow while the order is being filled. This path will specify various pods at which the tote stops to have particular items picked to fill the order.

Next, at 307, a tote is inducted into the system and begins passing through the distribution center according to its pre-specified path. As it travels through the distribution center, it stops at various pods where a computer system provides instructions for pickers to pick selected items for the order. In a preferred embodiment, pickers place specified order items into the tote, and verify the order item fulfillment by scanning each item placed into the tote, as well as the tote's license plate ID, with a handheld computing device (e.g., RF gun). After the picker has confirmed placement of the specified items into the designated tote, the tote is then reintroduced to the automated tote transport system, where it continues to travel along its designated tote path. Information about the picked items is fed back to a central computer system which tracks order fulfillment and inventory. The tote is routed through various pod locations until the order is completed. See 309. The tote path may be dynamically and automatically altered if problems are detected in any portion of the DC operations.

After all items for a particular tote have been picked and confirmed, the tote is routed to a shipping spur at 311. At this point, the tote contains all inventory items that are required to fulfill its component of the order. A shipping component of the distribution center can now take over processing the order. At 313, workers or mechanical systems unload the tote onto dollies, which may include other totes intended for a specific delivery route. At 315, workers or mechanical systems load the dollies and totes onto trucks destined for specified locations. The trucks deliver orders to the customers who have placed orders. At this point, the order fulfillment process is completed. The distribution computer system may be notified of a shipment confirmation.

Frequently a distribution center is divided into multiple "ambiences," which dictate special storage or handling. For example, many grocery items must be refrigerated. Such items are stocked in a refrigeration ambience. Wines and cigars can also be stocked ambiences having specific temperature and humidity controls. Other items may be deemed fragile therefore stocked or handled separately from other items. Each of these ambiences may have its individual items grouped by velocity and stocked according to the requirements of this invention. In one sense, each ambience may be viewed as a separate distribution center within a larger distribution center having multiple ambiences.

Figure 4:
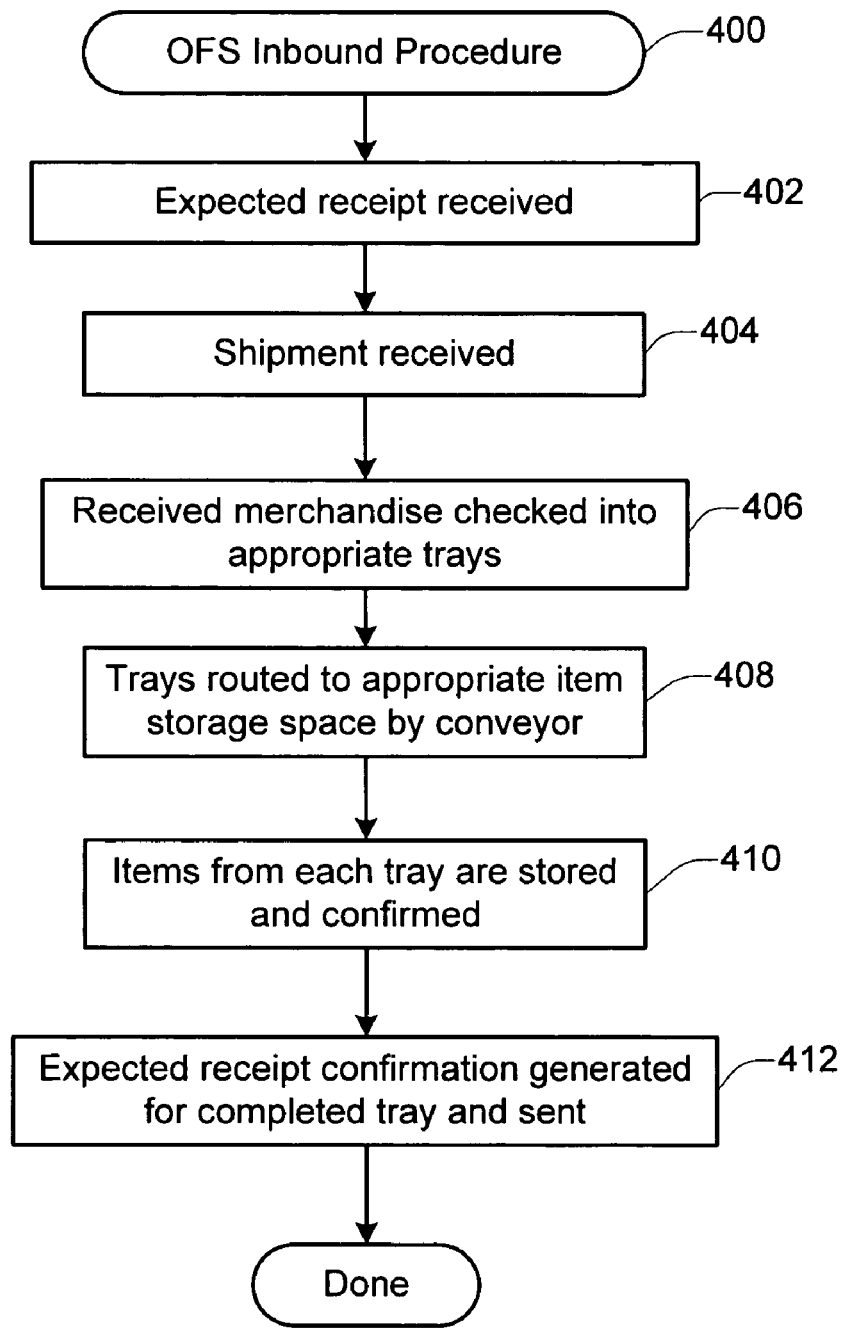
FIG. 4 is a flow chart depicting a high level inventory put away method that may be employed to implement the present invention.

Like the outbound procedure depicted in FIG. 3, items may be received and restocked in the distribution center using an automated material handling and transport system. FIG. 4 shows a flow diagram of an inventory restocking procedure 400 in accordance with a specific embodiment of the present invention. Typically, this process will be controlled and implemented by one or more computer systems associated with a distribution center. The inventory restocking process initially begins with a purchase order being generated for specific inventory items. At 402, an expected receipt relating to the purchase order is received. The expected receipt data may include, for example, the vendor name, an expected receipt ID number, estimated arrival time of the shipment, and the SKUs and quantities of the items ordered. Once the expected shipment is received (404) at the distribution center, the received merchandise is checked (406) into appropriate trays. A tray represents a container which may be used to transport received items of merchandise for restocking. Each tray may include a unique, scannable license plate ID. When merchandise is checked into a tray, both the merchandise and the tray may be scanned using an RF gun. The trays are then automatically routed (408) to their appropriate locations using the automated conveyer system. Once a tray arrives at its designated location, the items from that particular tray are stored (410) and confirmed by the picker (via an RF gun, for example). According to a specific embodiment, for each completed tray of items restocked, an expected receipt confirmation is generated (412) and stored. The expected receipt confirmation data may include, for example, the expected receipt ID, the SKU(s) of the items restocked and their respective quantities.

Figure 5A:
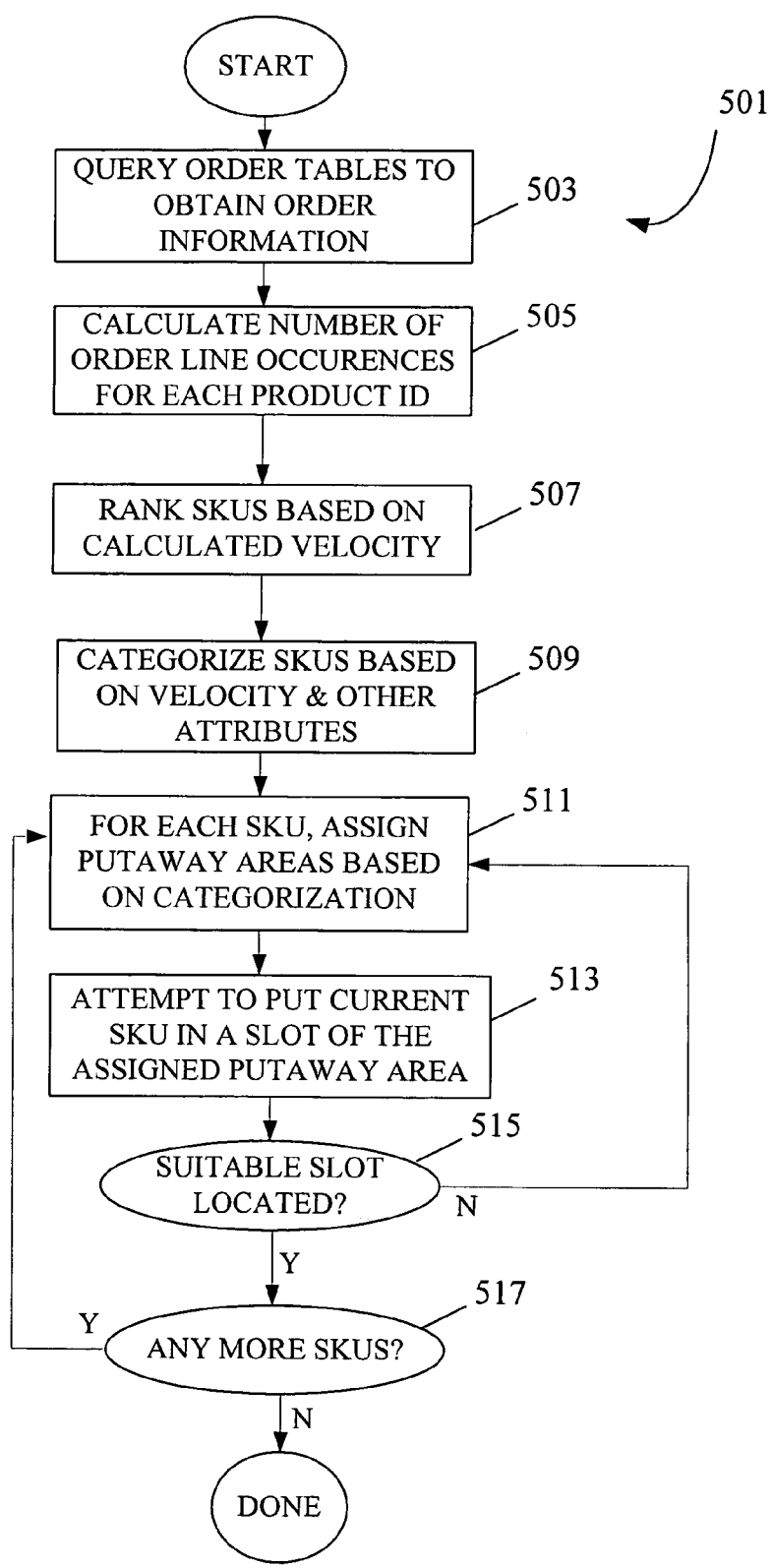
FIG. 5A is a process flow chart depicting a detailed put away process using velocity to make decisions about replication.

FIG. 5A depicts a process flow diagram of a detailed procedure for calculating velocity and using it to assign putaway locations. This process is but one of many that can be employed within the context of this invention. As depicted, a process 501 begins at 503 with the system querying order tables (or other data sources) on recent orders to obtain specific information about such orders.

After obtaining the relevant order information, the system calculates the velocity of the various items for which order information has been obtained. See 505. In a preferred embodiment, the system makes this calculation for each item by summing the number of order lines for this item over a defined period of time. In order tables, orders are represented by product IDs, which are distinct for each SKU, and quantities. Each order line represents a particular SKU appearing on a customer order. For example, a customer order may specify three apples and ten oranges. Apples would form one order line and oranges would form a second order line. In this embodiment, the quantity of items associated with each order line is not factored into the velocity calculation. In an alternative embodiment, the quantity information is used to calculate velocity.

Preferably, the basic sampling interval chosen for calculating velocity accounts for any periodicity in the particular SKUs moving through the distribution center. For groceries, for example, one week accounts for most of the periodicity. Thus, in the case of a grocery warehouse, the number of order line occurrences would be calculated over one week sample intervals. To improve the accuracy of this calculation for slow moving SKUs, the basic sample interval may be increased selectively for such SKUs. In one implementation, the system determines whether the SKU has reached a threshold number of order lines within the basic sample interval. If such threshold is not met, the system then extends the sample interval over which the velocity is calculated.

After velocity has been calculated 505, the system ranks the SKUs based upon their calculated velocities. See 507. Typically the ranking will place the fastest movers at one end of a scale and the slowest movers at the other end of the scale. Next, the system categorizes the SKUs based upon their relative velocity rankings as well as certain other attributes. See 509. Among the other attributes that may be considered are ambience (already mentioned), conveyability, fragility, and special handling considerations such as security for very valuable items and regulatory consideration for prescription drugs, for example.

Based upon velocity and one or more of these other attributes, the system next assigns putaway areas. See 511. Typically, a putaway area represents a collection of slots or bins within a particular pod. In one example, a single pod includes three separate carousels. Each such carousel is divided into multiple areas. And, each area contains a number of slots. Each slot is reserved for a specific SKU. In one example, an area might represent the middle three shelves of a particular carousel.

Note that when an item's velocity indicates that it should be replicated, the system takes account of this when assigning putaway areas at 511. In some instances, an item whose velocity is not sufficiently great to indicate forced replication, may be "opportunistically" replicated. This may occur when more instances of that item must be put away than can fit in a single slot. When this occurs, the system opportunistically replicates that item over multiple pods.

The system may account for numerous factors when identifying putaway slots. In addition to the velocity and other attributes and the possibility of opportunistic replication, the system may consider the location of existing inventory in assigning a putaway area. Using any or all of these criteria, the system preferably uses some probability information and possibly random number generation to assign putaway areas. Typically, as part of the operation at 511, the system also assigns multiple putaway areas that may be represented as a chain of putaway areas. The first member of the chain is the most preferable putaway area and subsequent members are less preferred areas.

With a proposed putaway area in hand, the system next attempts to put the current SKU in a slot within the assigned putaway area. See 513. In some instances, this will not be possible because all slots in the area are taken. Thus, the system determines, at 515, whether a suitable slot has been located. If not, process control returns to 511 where the system next assigns a different putaway area. In the embodiment just described, this next putaway area will be the next successive putaway area provided in a chain of putaway areas. Eventually, the system will find an appropriate slot within one of the assigned putaway areas. When this occurs, the system determines whether there are any more SKUs to be processed at 517. If so, it assigns one or more proposed putaway areas at 511. If not, the process is completed.

Figure 5B:
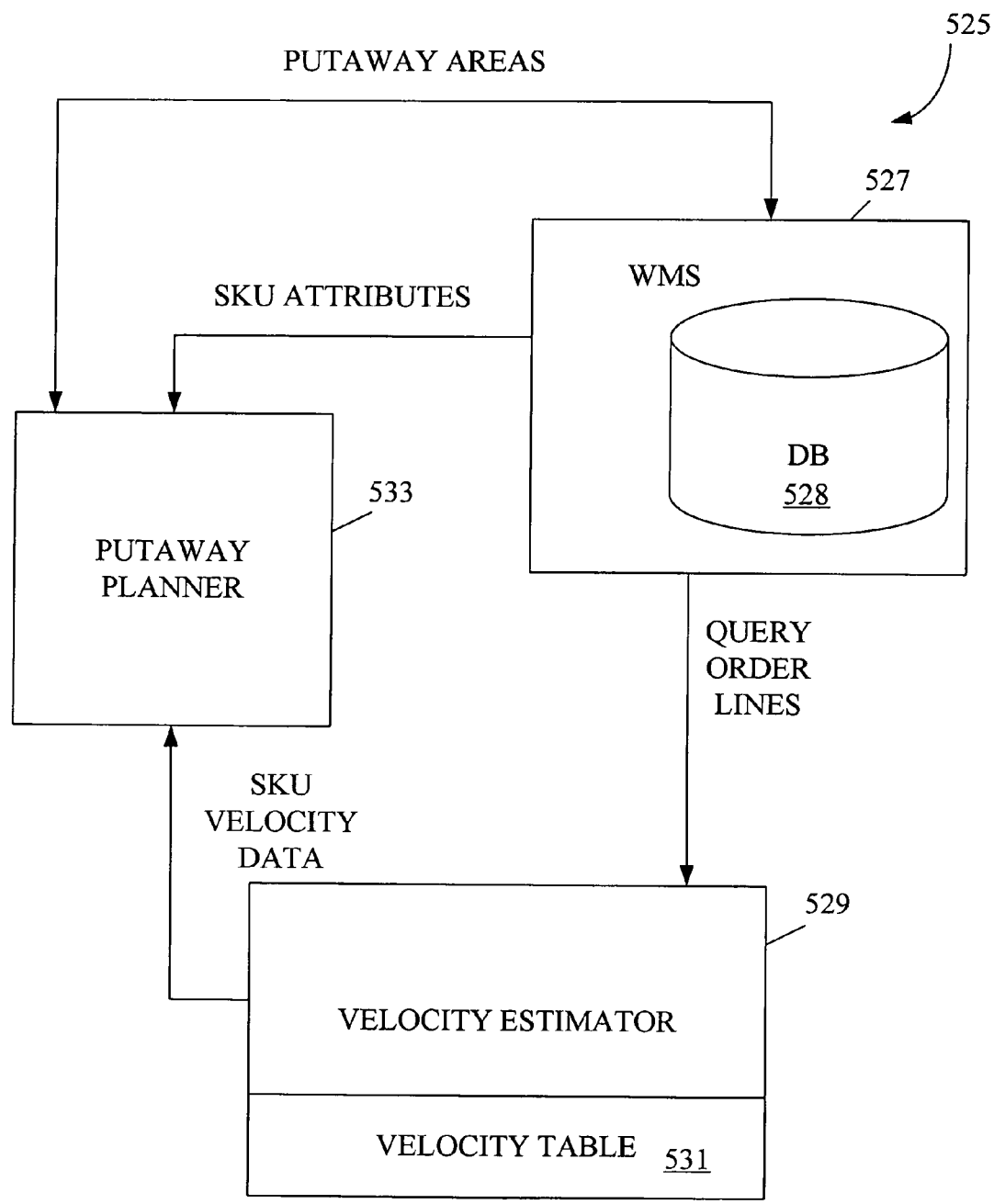
FIG. 5B is a block diagram depicting logical blocks that may be employed to identify put away locations in a distribution center in accordance with one embodiment of this invention.

FIG. 5B presents a block diagram of various logical modules that may be used to implement the method of FIG. 5A or a similar method. As shown, a system 525 for providing putaway tasks includes a warehouse management system 527, a velocity estimator 529, and a putaway planner 533. Any one or more of these logical entities may be implemented at hardware, software, or some combination thereof.

In a preferred embodiment, warehouse management system 527 includes a database 528 containing logical tables providing order information organized as order lines for example. Preferably, the velocity estimator 529 queries warehouse management system 527 to obtain order line information. Velocity estimator 529 then uses such order line information to calculate velocity as indicated at 505 in FIG. 5A. The velocity estimator may then rank the individual SKUs and place them in a velocity table 531.

Putaway planner 523 categorizes specific SKUs based upon SKU velocity data from velocity estimator 529 and other SKU attributes from warehouse management system 527. Based on this information, putaway planner 533 assigns putaway areas. As mentioned in the discussion of operation 511, the putaway planner may generate a chain of proposed putaway areas. It provides one or more of these putaway areas to the warehouse management system 527. The warehouse management system then attempts to slot a particular SKU in the area identified. If it cannot accomplish this, it notifies putaway planner 533. Putaway planner 533 then provides a different proposed putaway area to warehouse management system 527. When warehouse management system 527 finds an appropriate slot within the proposed area, it generates a putaway task containing instructions for another module within the distribution center to put inventory at assigned slots. In one example such other module is an automated material handling controller. Warehouse management system 527 may use the putaway information to update inventory information in its database 528.

This invention is preferably implemented as software stored or transmitted on a machine-readable medium and executed on a processor. The invention may also be implemented on firmware provided with a processor for executing instructions specified by the firmware. In an alternative embodiment, the invention is implemented on specially designed or configured processing hardware.

Because program instructions and data may be employed to implement the systems/methods described herein, the present invention relates to machine-readable media that include program instructions, velocity data, etc. for performing various operations described herein (e.g., grouping inventory items based on their location on a velocity curve and logically distributing those items in put away regions of a distribution center). Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although certain preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A computer-implemented method of effecting electronic commerce of an on-line store, including distributing inventory to facilitate order throughput in a distribution center that has a plurality of storage areas, the method comprising:

determining, by a computing device, how rapidly a product is consumed based on order information of a plurality of customers over a period of time;

determining, by a management system of the distribution center, whether the product is to be stored in one storage area or is to be stored in more than one storage area of the distribution center based on how rapidly the product is consumed;

allowing a customer to access an order history of the customer and information regarding the product via a computer interface of the on-line store;

allowing the customer to place a current order via the computer interface, the current order having an order status;

allowing the customer to access at least one attribute of the order status of the customer's current order via the computer interface of the on-line store, wherein at least one product in the distribution center has a status, and the order status accessible depends on the status of the at least one product in the distribution center; and generating a report regarding the status of at least one attribute of the distribution center, wherein the order history is accessed from a database of the computer-interface of the on-line store, where information regarding the current order is stored, wherein information regarding the movement of products in the distribution center is stored in a database of the management system of the distribution center, wherein information from the database of the computer-interface and information regarding the movement of products from the database of the management system of the distribution center are periodically transmitted to a data warehouse system, and wherein the data warehouse system analyzes information received to generate the report.

2. The method of claim 1, wherein the management system of the distribution center manages the movement of a plurality of conveyors in the distribution center, and wherein at least one conveyor is configured to move a container to a storage area to allow a product in the container to be stored in the storage area.

3. The method of claim 1, wherein the management system of the distribution center manages the movement of a conveyor in the distribution center, wherein the management system of the distribution center manages the movement of a carousel in the distribution center to store different products, and wherein the carousel is configured to be proximate to the conveyor to assist moving products from the conveyor to be stored in the carousel.

4. The method of claim 1, wherein the management system of the distribution center manages the movement of a plurality of carousels in the distribution center to store different products, wherein a storage area is configured to have a plurality of carousels, and wherein the management system of the distribution center can determine to store the product in each of the plurality of the carousels of the storage area.

5. The method of claim 1, wherein the management system of the distribution center manages a plurality of scanners in the distribution center.

6. The method of claim 5, wherein at least one scanner is used to keep track of the product being stored in a plurality of storage areas.

7. The method of claim 6, wherein the scanner is based on RF technology.

8. The method of claim 1, wherein at least some information in the distribution center is received by the management system of the distribution center from handheld computing devices in the distribution center via a wireless interface.

9. The method of claim 8, wherein at least one handheld computing device is used by a distribution center employee regarding inventory movement in the distribution center.

10. The method of claim 1, wherein the customer is allowed to create a shopping list at the on-line store with at least one attribute of the shopping list customizable by the customer.

11. The method of claim 10, wherein based on information regarding the customer, the computer-interface retrieves a preference of the customer to present customized information to the customer.

12. The method of claim 1,
wherein the data warehouse system is configured to generate reports on daily and weekly activities of a system managing the computer interface.

13. The method of claim 12, wherein at least one report is on customer order activities.

14. The method of claim 12, wherein the data warehouse system is configured to report on at least one status of the management system of the distribution center in a minute-to-minute manner.

15. The method of claim 1,
wherein a representative of the on-line store is allowed to access the customer's order history from a database,
wherein the representative does not have to be in the distribution center, and
wherein the representative is allowed to enter information related to the customer to the database, and information in the database is periodically transmitted to the data warehouse system.

16. The method of claim 15, wherein the representative is allowed to access the customer's order history via a handheld mobile device to fulfill the current order of the customer.

17. The method of claim 15, wherein the representative is allowed to access the customer's order history while managing a request from the customer, via a management system for customer relationship.

18. The method of claim 17, wherein the representative is allowed to cancel the customer's current order.

19. The method of claim 15,
wherein the data warehouse system includes a data store and a data warehouse,
wherein the data warehouse system receives information from the database of the computer-interface and information regarding the movement of products from the database of the management system of the distribution center, and stores such information in the data store, and
wherein the data warehouse includes tables derived from information in the data store.

20. The method of claim 1,
wherein a representative of the on-line store is allowed to access the customer's current order via a handheld mobile device to fulfill the current order of the customer,
wherein the representative does not have to be in the distribution center, and
wherein the representative is allowed to enter information related to the customer to a database, and information in the database is periodically transmitted to the data warehouse system.

21. The method of claim 20, wherein the handheld mobile device includes a scanner that allows the representative to scan a product in the current order of the customer.

* * * * *